United States Patent Office 3,280,048
Patented Oct. 18, 1966

3,280,048
SOLID HEAT TRIGGERED COMPOSITIONS CAPABLE OF FORMING A POLYURETHANE FOAM
George R. Griffin, Tyngsboro, Patrick L. Sciaraffa, Somerville, and Albert J. Traveis, Melrose, Mass., assignors to Avco Corporation, Cincinnati, Ohio, a corporation of Delaware
No Drawing. Filed Mar. 27, 1963, Ser. No. 268,460
19 Claims. (Cl. 260—2.5)

This application is a continuation in part of the copending application of George R. Griffin and Patrick L. Sciaraffa, Serial Number 194,699, filed May 14, 1962, now abandoned.

This invention relates to a free flowing powder composition which is stable at room temperature for an extended period but which, when heated to an elevated temperature in the order of 70–130° C. will melt, expand and cure to form a plastic foam structure having a uniform pore size and a low density.

More particularly, this invention relates to a free flowing powder comprising particles of a thermoplastic isocyanate terminated urethane resin which is a solid at room temperature and particles of a solid material which liberates water at an elevated temperature. In addition, the powder composition desirably contains a catalyst to promote the reaction between water and free isocyanate groups, a surface active agent to control cell size distribution and a material which while a solid at room temperature melts and acts as a solvent for the resin at foaming temperature thereby reducing the viscosity of the melt and facilitating the foaming process. Oother ingredients conventional to the isocyanato foam art such as fillers, pigments, dyes and the like may be added if desired.

Polyurethane foams are of great interest technologically since such foams can be produced with a wide variety of physical properties such as density, cell size, strength, flexibility and the like. Conventionally, polyurethane foams are produced by mixing together a polyisocyanate, a polyol, (usually a polyester) and water. The isocyanato groups in the polyisocyanate react with the hydroxy groups of the polyol (polyester) to form urethane linkages according to the following basic reaction:

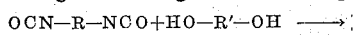
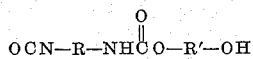

At the same time the isocyanato groups react with water to form urea linkages accompanied by the release of carbon dioxide according to the following basic reaction:

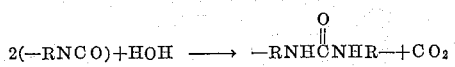

Both reactions produce polymeric chains and under normal conditions proceed exothermally with great rapidity. In common with all such reactions, mono-functional reactants act as chain stoppers, bi-functional reactants produce linear polymers and poly-functional reactants produce cross-linked polymers. In view of the rapidity with which both reactions take place, it has been necessary in common practice to keep the polyisocyanate component separate from the hydroxy containing materials until the instant that it is desired to initiate the reaction.

The pracical problems involved in producing suitable foams relate first to providing the isocyanate containing reactant and the hydroxy containing reactant in such a physical condition that they may be mixed together intimately and substantially instantaneously before the reaction proceeds to any significant degree. This normally requires that the two components be liquid at the time of mixing. On the other hand, in order to produce a foam, the viscosity of the mix at the time of the evolution of the major portion of the carbon dioxide should be such that the carbon dioxide gas remains trapped and forms bubbles that remain in the mass. This means that the reacting mixture cannot be so liquid as to permit the gas bubbles to agglomerate or to emerge as bubbles from the mix nor so rigid that the gas cannot form bubbles in the mix but must diffuse through the mix.

Thus in the conventional art, the attempt has been to provide a two component system wherein the hydroxy containing materials are kept separate from the isocyanate containing materials, where the two components are fluid enough at the point of mixing that an intimate homogeneous mixture can be obtained before any substantial reaction can take place and where the viscosity increases due to chain length increase caused by the reaction, at the temperature of the reaction is sufficiently rapid to prevent the escape of the gas released by the reaction of the isocyanate with the water, but not so rapid as to prevent the formation of a low density foam.

Working with a two component system has many disadvantages, especially in a reaction such as this where the reaction is initiated merely by mixing the components, where the reaction is exothermic and where the rate of reaction is accelerated by heat. The commercially successful methods of making such foam involve careful and continuous metering of the two components, continuous high sheer mixing of the two components and continuous discharge of the mixture from the mixing chamber to some sort of moving support. Any variation in the relative proportions of the components will necessarily effect the quantity and uniformity of the foam as will failure to obtain a substantially homogeneous mixture of the components almost immediately after they are blended. The necessity for the continuous discharge of the mixture has limited the utility of such foam. For example, it is most difficult, if not, for practical purposes, impossible to conduct the foam reaction in a succession of closed molds or in deep voids. The reason for this is that the reaction mixture starts to increase its viscosity and to gel upon mixing. Thus the ability of the mixture to flow is time dependent. If the flow of the mixture has to be interrupted as in the case of the filling of a succession of molds, the ability of the mixture to flow is reduced during the interruption. Likewise, if it takes an appreciable length of time for the mixture to reach the position where it is desired to be placed as in the case of deep voids, the ability of the mixture to flow may be so reduced during this time that the void cannot be filled with foam.

In view of these difficulties, attempts have been made to control the initiation of the reaction so that the reaction mixture can be properly located in the desired placement and thereafter the reaction initiated usually by heat. Normally, these attempts have involved either reducing the temperature of the mixture to such a low value that the rate of the reaction is very slow or by "blocking" the isocyanate by first reacting it with a material such as a phenol where the blocking reaction is reversible and the reaction product results in the regeneration of free isocyanate at some elevated temperature. The stabilization of foamable reaction mixtures based on components, common to the accepted art and which are normally liquid at room temperature, by chilling to low temperatures such as those which may be attained through the use of Dry Ice has been employed to extend their useful life. Such a process must, however, be associated with all of the obvious disadvantages of providing the necessary uninterrupted low temperature conditions throughout the entire period during which the mixture is stored up to the time when foaming is initiated. The difficulty with the blocking technique in the case of foams is that the "unblocking" reaction takes time and much of the gas produced by the foam reaction as the isocyanate component is unblocked, is lost since the polymerization reaction (which increases the viscosity of the mix), is limited by the rate of unblocking.

We have discovered that a single pre-mixed system containing all of the necessary components which is unreactive and stable for extended periods at room temperature but which upon heating to a predetermined temperature in excess of room temperature will melt, fuse, expand and cure to form a plastic foam structure can be provided by mixing finely divided particles of a thermoplastic isocyanate terminated urethane polymer having a softening point between about 30° C. and about 70° C. and preferably between about 35° C. and about 60° C. and having a free isocyanate content determined stoichiometrically between about 5 and 21% of the weight of the polymer and finely divided particles of a material which is solid at room temperature but which provides a source of water when heated to an elevated temperature in the range of about 50° C. to about 120° C. In general, the thermoplastic isocyanate terminated urethane polymer is prepared by reacting a polyol (normally a diol) with a controlled excess of a diisocyanate in the presence of suitable catalyst and under properly controlled conditions of temperature and reaction time. The solid material which provides a source of water when heated is selected from those components where water is held as a part of a molecule as water of hydration including both the inorganic and the organic hydrates, or where water is released by decomposition as in the case of boric acid.

In addition, the powder composition preferably contains a catalyst to promote rapid reaction between the water and the free isocyanato groups. Suitable catalysts include organo tin salts or organic bases such as the tertiary amines. It also preferably contains a surface active agent to control the size and the size distribution of the cells. The composition in some instances may contain a material which is solid at room temperature, but which melts at some temperature below the foam temperature and when molten acts as a solvent for the polymer and thereafter as a plasticizer for the finished foam. Other solid compounding ingredients such as fillers, pigments, dyes and the like may be added to the powdered mixture as desired.

The reaction product of an isocyanate-diol-water reaction is usually subject to destructive decomposition if maintained at temperatures substantially in excess of about 150° C. For this reason, it is preferable to conduct the reaction at a temperature below about 130° C. such as some temperature in the range of 100° C. to 125° C. for example 115° C. In order to obtain a suitable foam, the urethane resin should be quite fluid at the reaction temperature. To achieve this, the softening temperature of the resin as determined by the Fisher-Johns method should be at least 30° C. below and preferably 40–50° C. below the reaction temperature of the foam reaction. On the other hand, the softening point of the urethane resin should be at least 30° C. in order to permit the resin to be ground into individual particles at room temperature. Indeed, if the softening temperature is less than about 32 or 33° C., even though the resin can be ground into individual particles, there may be some tendency for the particles to re-fuse on standing. This is undesirable.

Likewise, the water releasing solid is selected from those which will release substantial quantities of water at temperatures which are below the reaction temperature. However, this material should not have a substantial vapor pressure of water at room temperature and should not release substantial quantities of water below the melting point of the resin and preferably not less than about 20° above the Fisher-Johns softening temperature of the resin.

Quite obviously, the material which is solid at room temperature, but which acts as a solvent at the reaction temperature must have a melting point below the reaction temperature. Typical examples of the urethane resin, of the foamable powder and of the resulting foam are presented in the following examples.

EXAMPLE I

Preparation of urethane resin 128 grams of 1,5 pentanediol were added to 400 grams of toluene diisocyanate (a mixture of 80 weight percent toluene 2,4 diisocyanate and 20 weight percent of toluene 2,6 diisocyanate) contained in a 1000 cc. glass reactor equipped with a high speed stirrer at a rate such that the temperature was maintained at between 90° and 100° C. by the heat of reaction. This addition required one hour. After the exotherm had subsided, the mixture was held at a temperature of 100° C. for a period of 17 hours. The resulting molten urethane polymer was then poured into an aluminum dish and allowed to cool to room temperature. Upon cooling, it became a hard, brittle mass with a softening temperature of 47° C. and a melting point of 50–54° C. The mass was then ground to a fine powder by a rotary impact mill.

It is of interest to note that the reaction product, if permitted to cool to room temperature immediately after the exothermic reaction had subsided, did not become a hard, brittle resinous mass but remained as a viscous fluid.

The free isocyanate content of the resin was determined stoichiometrically as follows:

|  | Weight, gms. | M.W. | Mols. |
|---|---|---|---|
| Diisocyanate | 400 | 174 | 2.3 |
| Diol | 128 | 104 | 1.23 |

No. of equivalents —NCO $2 \times 2.3 = 4.6$
No. of equivalents —OH $2 \times 1.23 = 2.46$ Assuming a complete reaction between the available —OH groups and the available —NCO groups, the number of free (unreacted) —NCO groups is 4.6–2.46 or 2.14.

The equivalent weight of the —NCO group is 42. Therefore 2.14 equivalents at 42 gram/equivalent=90 grams. Since the total weight of the resin is 400+128 or 528, the percent free isocyanate is 90/528 or 17%.

The isocyanate content as determined by the back titration method where an excess amount of dibutyl amine dissolved in dioxane is added to a dioxane solution of the polymer and the quantity of unreacted dibutyl amine is determined by back titration with hydrochloric acid was 15.6%.

Preparation of foaming powder and of foam 5 parts by weight of the powdered polymer was thoroughly blended with 1 part of sodium tetraborate decahydrate, 0.05 part of dibutyl tin di-2-ethyl hexoate (catalyst) and 0.05 parts of Silicone L–520 [1] (surface active agent). The blended mixture was a free flowing powder that was stable at room temperature. A portion of the powder mixture was placed in an aluminum dish and heated at 100° C. for 25 minutes. A rigid, cured foam resulted which had good cell structure, good strength and a density of approximately 6 pounds/cubic foot.

Samples of the powder mixture have been stored in sealed containers for various periods. At room temperature very little change in the foaming ability is noted over periods up to a week or so.

At temperatures of 40° F. and lower, the time limit for storage is greatly extended and samples stored at such lower temperatures are still capable of producing acceptable foams after several months.

---

[1] Silicone L–520 is described as a mixture of block copolymers wherein each copolymer contains a siloxane polymer and a plurality of oxyalkylene polymers as set forth in U.S. Patent 2,834,748 and is supplied by Union Carbide Company.

EXAMPLE II

Following the procedure of Example I, 165.6 grams of diethylene glycol was added to 400 grams of toluene diisocyanate (80–20 mixture of the 2,4- and the 2,6-isomers) at such a rate as to maintain the temperature between 90 and 100° C. After the exothermic reaction had subsided, the mixture was held at 100° C. for 19 hours. Thereafter, the polymer was allowed to cool to room temperature resulting in a hard brittle resinous mass with a softening point of 52° C. and a melting point of 60–65° C. The solid polymer was ground to a fine powder. The free isocyanate content determined stoichiometrically was 11% and by the back titration method was 9.8%.

15 parts of the powdered resin were thoroughly blended with 1 part of sodium tetraborate decahydrate, 3 parts of triphenyl phosphate (potential solvent), 0.05 part of Silicone L-520 and 0.05 part of dibutyl tin di-2-ethyl hexoate. A free flowing powder resulted which upon heating to 100° C. for 20 minutes produced a rigid, cured foam having good cell structure, good strength and a density of approximately 4.5 pounds/cu. ft. The powder mixture of Example II shows similar storage characteristics to those of the powder mixture of Example I.

EXAMPLE III

Following the procedure set forth in Example I, 328 grams of a polyethylene glycol having an average molecular weight of 200 (Carbowax 200, Union Carbide Co.) was slowly added to 400 grams of toluene diisocyanate (80–20 mixture as above) at such a rate as to maintain the temperature at between 90 and 100° C. After the exotherm had subsided, the mixture was held at 100° C. for 15 hours. Thereafter it was cooled to room temperature and the solid product ground to a fine powder. The softening temperature was 36° C. and the melting point was 39–42° C. The free isocyanate content was 7.6% determined stoichiometrically and 7.0% determined analytically.

A free flowing powder was produced by blending 5 parts of the resin with 1 part of sodium tetraborate decahydrate, 0.05 part of dibutyl tin di-2-ethyl hexoate and 0.05 part of Silicone L-520. This powder mixture, when heated to 100° C. for 20 minutes, produced a strong, rigid foam having a good cell structure and a density of about 11 pounds/cu. ft.

EXAMPLE IV 4 parts of the resin of Example II and 1 part of the resin of Example III was blended with 1 part of sodium tetraborate decahydrate, 0.05 part of dibutyl tin di-2-ethyl hexoate and 0.05 part of Silicone L-520. The resulting free flowing powder was heated to 100° C. for 20 minutes and gave a strong, slightly flexible foam of good cell structure having a density of about 5.5 pounds/cu. ft.

EXAMPLE V

Following the procedure of Example I, 220.8 grams of diethylene glycol containing 0.6 part of N-methyl morpholine (a catalyst for the reaction) was slowly added to 600 grams of toluene diisocyanate (80–20 mixture as above) at such a rate as to maintain the temperature between 90 and 100° C. After the exotherm had subsided, the mixture was heated at 100° C. for 6 hours. The product was permitted to solidify at room temperature and was ground to a fine powder. The product was a hard resin with a softening temperature of 30–33° C. and a melting point of 35° to 42° C. Its free isocyanate content as determined stoichiometrically was 14.1% and as determined analytically was 14.0%.

400 parts of the resin were thoroughly blended with 90 parts of triphenyl phosphate, 27 parts of sodium tetraborate decahydrate and 3 parts of dibutyl tin di-2-ethyl hexoate producing a free flowing powder. When heated at 100° C. for 20 minutes, the composition produced a strong, rigid foam having good cell structure and a density of about 5 pounds/cu. ft.

As shown in Examples VI and VII which follow a very marked improvement in cell size distribution and over-all uniformity of the foam can be obtained if the potential solvent and the catalyst are added to the urethane resin while the urethane resin is still molten. Mixing at this stage effects a very complete solution of the components. When this procedure is followed the melt is subsequently cooled to room temperature and the resulting solid is ground in a Wiley mill or an equivalent grinding unit to pass 25 mesh. The water sources may be mixed with this ground material by simple dry blending.

The addition of the catalyst and of the potential solvent to the molten resin improves the effectivenes of both ingredients. In the case of the catalyst this improvement is shown by the superiority of the resulting foam structure. In the case of the potential solvent the effectiveness of the pre-melt technique is shown by the fact that a smaller quantity of such potential solvent is required to give equivalent results. For example, only 2.0 to 6.7 parts per 100 parts of resin or triphenyl phosphate as a typical potential solvent is required when added according to the pre-melt technique to give the same beneficial effect as 20 to 23 parts per 100 parts of resin when added as a dry mix as in Example V. Concentrations of triphenyl phosphate when added by the pre-melt technique in excess of 13 parts per 100 parts of resin causes a slight deterioration in cell structure and concentration in excess of 6.7 parts per 100 parts of resin causes some dimensional instability at 100° C.

EXAMPLE VI

Following the procedure of Example 1, 689 grams of diethylene glycol containing 1.8 grams of N-methylmorpholine was slowly added to 1800 grams of toluene diisocyanate (80–20 mixture as above) at such a rate as to maintain a temperature of 100±5° C. After the addition was complete, the temperature was maintained for a total time of 7 hours including the addition period.

With the temperature still at 100° C., 60 grams of triphenyl phosphate and 14.4 grams of dibutyltin-di-2-ethylhexoate were added and the solution was thoroughly stirred. The resulting produce was allowed to solidify at room temperature and was subsequently ground to pass 25 mesh.

To 100 parts of the powdered solid was added 9.43 grams of dry powdered boric acid. The mixture was thoroughly blended to produce a free-flowing, white powder. This powder blend, when heated to 115° C. produced a uniform foam of fine cell size and having a density of 2.0–2.3 pounds/cu. ft.

Boric acid has proven to be superior to all inorganic and organic hydrates studied as a source of water for the foaming reaction, in that boric acid produces a formulation which has an extended shelf life at room temperature. Formulations based on boric acid have shown no appreciable change in activity upon at least four months storage. The concentration recommended is between 6.66 parts and 10 parts of boric acid per 100 parts of resin with optimum results being obtained at 6.66 parts per 100. The material should be dry and in powder form for best results.

EXAMPLE VII

Following the procedure of Example I, 13.2 grams of polyether tetrol resulting from the condensation of pentaerythritol with propylene oxide, having a hydroxyl number of 560–570 and identified as Pluracol PeP and identified as Pluracol PeP 450 (Wyandotte Chemicals Corp.) and containing a 0.2 gram of N-methylmorpholine was slowly added to 25 grams of toluene diisocyanate (80–20 mixture as above) at such a rate as to maintain a temperature of 100±5° C. After the addition was complete, the product was heated to 100° C. for four hours after which 1 gram of triphenyl phosphate and 0.2 gram of dibutyltin-di-2-ethylhexoate were added and the solution thoroughly stirred. The product was allowed to solidify at room temperature and was subsequently ground to pass 25 mesh.

The above powdered product was dry-blended with 2.0 grams of dry, powdered, boric acid. This powder blend, when heated to 115° C., produced a foam having a density of 3.8 pounds/cu.ft., and showing no dimensional change after being heated at 100° C. for 48 hours.

For the purpose of determining the variations in physical properties due to change in quantity and nature of reactants, a number of resins were prepared according to the procedure outlined in Example I. In each case, the sample was post heated after the exotherm had subsided at 100° C. for a period of between 12 and 20 hours. The results are tabulated in Table I which follows. In this table, the abbreviation TDI stands for toluene diisocyanate (80-20 mixture of isomers); TODI for 4.4′ methylene di-o-tolylisocyanate; MDI for methylene bis (4-phenylisocyanate); EG for ethylene glycol; DEG for diethylene glycol; TEG for triethylene glycol; 1,2P for 1,2 propanediol; 1,4B for 1,4 butanediol; 1,5P for 1,5 pentanediol; 1,10D for 1,10 decanediol; PEG for Carbowax 200 and PPG for polypropylene glycol. Quantities are expressed in grams. The free isocyanate content (percent NCO) has been determined stoichiometrically. The softening temperature and melting point were determined by the Fisher-Johns melting point apparatus.

pentanediol (M.W. 104) about 12½ ... 17½%, with diethylene glycol (M.W. 106) about 10–16%, with triethylene glycol (M.W. 150) 6–12½% and with polyethylene glycol 200, 5–10%.

The dimensional stability of the heat triggered foams at elevated temperatures may be substantially improved by employing a poly-functional cross-linking agent in the preparation of the isocyanate semi-pre-polymer. The foams based on a semi-pre-polymer derived from toluene diisocyanate and diethylene glycol show good dimensional stability for several weeks at 100° C. and for at least 480 hours at 115° C. The stability falls off at 125° C. and at 150° C. the samples shrink very substantially in only a few hours. When the diethylene glycol is replaced by the polyether tetrol described in Example VII in the semi-pre-polymer preparation, the resulting foam is dimensionally stable for several days at 150° C. without shrinkage. Similar improvements in dimensional stability at elevated temperatures were obtained with semi-pre-polymers using either a polyoxypropylene derivative of sorbitol (Pluracol S.P. 760—Wyandotte Chemicals Corp.) or a polyoxypropylene derivative of trimethylol propane (Pluracol T.P. 1540—Wyandotte Chemicals Corp.).

Foaming properties of the several resins were compared by preparing a series of powder compositions each having, unless otherwise noted, the following composition:

Powdered resin _____ 5
Sodium tetraborate decahydrate _____ 1

TABLE I

| Resin | Reactants | Percent NCO | Soft Temp., ° C. | Melt Temp., ° C. | |
|---|---|---|---|---|---|
| 1 | TDI 50 E G, 12.1 | 12.5 | 100-110 | | Brittle, grindable. |
| 2 | TDI 50 E G, 10.2 | 17.7 | 55 | 57-73 | Brittle grindable. |
| 3 | TDI 50 E G, 9.3 | 19.5 | 45 | 48-53 | Hard, brittle. |
| 4 | TDI 50 E G, 8.4 | 22 | | | Soft, sticky, powder fuses on standing. |
| 5 | TDI 50 DEG, 20.7 | 11 | 52 | 60-65 | Brittle. |
| 6 | TDI 50 E G, 17.5 | 15.3 | 50-55 | 60-65 | Brittle. |
| 7 | TDI 50 DEG, 15.9 | 17.5 | | | Borderline, soft. |
| 8 | TDI 50 DEG, 14.3 | 20.0 | | | Soft, sticky. |
| 9 | TDI 50 TEG, 29.3 | 9.8 | 50 | 55-57 | Brittle. |
| 10 | TDI 50 TEG, 27.5 | 11.2 | 38-40 | 44-48 | Do. |
| 11 | TDI 50 TEG, 24.7 | 13.8 | | | Soft, sticky. |
| 12 | TDI 50 TEG, 22.2 | 18.3 | | | Very soft. |
| 13 | TDI 50 1, 4B, 17.5 | 9.9 | 75 | 87-92 | Brittle. |
| 14 | TDI 50 1, 4B, 14.8 | 16.1 | 45-50 | 70-75 | Do. |
| 15 | TDI 50 1, 4B, 13.0 | 19.2 | | | Soft. |
| 16 | TDI 50 1, 4B, 12.1 | 20.7 | | | Soft, powder fused on standing. |
| 17 | TDI 50 1, 5P, 20.3 | 11 | 75 | 80-85 | Brittle. |
| 18 | TDI 50 1, 5P, 17.2 | 15.3 | 45 | 60-65 | Do. |
| 19 | TDI 50 1, 5P, 16.0 | 17.1 | 47 | 50-54 | Do. |
| 20 | TDI 50 1, 5P, 14.0 | 20.1 | | | Very soft. |
| 21 | TDI 50 PEG, 39.0 | 8.7 | 32 | 40-45 | Brittle, powder fused on standing. |
| 22 | TDI 50 PEG, 43.0 | 6.5 | 39 | 48-55 | Brittle. |
| 23 | TDI 50 PEG, 41.0 | 7.6 | 36 | 39-42 | Do. |
| 24 | TDI 50 PPG, 50 | 7.4 | | | Brittle, solid. |
| 25 | TDI 50 PPG, 47 | 8.6 | | | Do. |
| 26 | TDI 50 PPG, 44 | 10.0 | | | Do. |
| 27 | TDI 50 PPG, 41 | 11.5 | | | Hard, brittle. |
| 28 | TDI 50 PPG, 38 | 12.8 | | | Do. |
| 29 | TDI 50 PPG, 35 | 14.6 | | | Flexible, soft. |
| 30 | TDI 50 1, 2P, 15.8 | 10.2 | | | Hard, brittle. |
| 31 | TDI, 50 1, 2P, 13.2 | 15.2 | | | Do. |
| 32 | TDI 50 1, 2P, 10.8 | 20.2 | | | Do. |
| 33 | TDI 50 1, 10D, 33 | 9.9 | | | Do. |
| 34 | TDI 50 1, 10D, 26.4 | 14.8 | | | Soft, waxy. |
| 35 | TODI 50 E G, 9.0 | 4.9 | 61-75 | 82-85 | Rubbery. |
| 36 | TODI 50 E G, 7.0 | 9.8 | 53-60 | 65-70 | Hard, brittle. |
| 37 | TODI 50 E G, 5.0 | 15.1 | | | Liquid. |
| 38 | TODI 50 TEG, 20.6 | 5.5 | 57-62 | 78-83 | Hard, brittle. |
| 39 | TODI 50 TEG, 15.4 | 9.9 | 47-51 | 58-63 | Do. |
| 40 | TODI 50 TEG, 10.7 | 15.1 | | | Soft, solid. |
| 41 | MDI 50 E G, 10.2 | 6.75 | (¹) | (¹) | |
| 42 | MDI 50 E G, 8.2 | 9.8 | (¹) | (¹) | |
| 43 | MDI 50 E G, 6.2 | 14.8 | (¹) | (¹) | |
| 44 | MDI 50 E G, 4.4 | 19.8 | | 59-63 | Waxy. |
| 45 | MDI 50 TE G, 23.4 | 5.0 | 70-74 | 77-85 | Hard, brittle. |
| 46 | MDI 50 TE G, 18.0 | 9.8 | 50-58 | 57-60 | Do. |
| 47 | MDI 50 TE G, 13.1 | 15.0 | | | Liquid. |

¹ Did not melt at 100° C.

It will be noted that for a given isocyanate, the permissible range of the free isocyanate content to give a softening and melting point within the desired range decreases as the molecular weight of the diol increases. Thus the toluene diisocyanate and ethylene glycol (M.W. 62), resins having a free isocyanate content between about 16 and about 21% have softening temperatures between 70 and 30° C., respectively. With 1, 4-butanediol (M.W. 90), the range is 13 to 18% free isocyanante, with 1, 5-

Dibutyl tin di-2-ethyl hexoate _____ 0.05
Silicone L–520 _____ 0.05

The results obtained by heating such powder compositions at 100° C. for 20 minutes are tabulated at Table II. In the table, the following abbreviations have been used:

L520 for Silicone L–520
BH for benzohydrol, and
TPP for triphenyl phosphate

TABLE II

| Run | Resin | Other Ingredient | Density (lb./cu. ft.) |
|---|---|---|---|
| X118 | #3 | BH 3 gm | ¹6.0 |
| X119 | #3 | BH 1 gm | ¹5.5 |
| X120 | #6 |  | ¹5 |
| X274 | #6 | TPP 1 gm | 5.2 |
| X121 | #2 |  | ¹11 |
| X122 | #5 |  | ¹5 |
| X252 | #5 | TPP 1 gm | 13 |
| X123 | #9 |  | 6.5 |
| X124 | #13 |  | (²) |
| X125 | #14 |  | 5 |
| X126 | #17 |  | (²) |
| X127 | #18 |  | 6.5 |
| X276 | #18 | TPP 1 gm | 6 |
| X128 | #17 | BH 1 gm | 17 |
| X130 | #9 | L520 0.15 gm | 8.5 |
| X131 | #19 |  | 6.0 |
| X132 | #10 |  | 6.0 |
| X133 | #22 |  | 11 |
| X134, 1/2#5 | 1/2#22 |  | 8 |
| X135, 1/2#6 | 1/2#22 |  | 7.5 |
| X136, 1/2#9 | 1/2#22 |  | 11 |
| X137, 1/2#14 | 1/2#22 |  | 11 |
| X138, 7/10#5 | 3/10#22 |  | 12 |
| X139, #22a | (³) |  | 13.5 |
| X140 | #23 |  | 11.0 |
| X141, 1/2#5 | 1/2#22a | BH 1 gm | 12.0 |
| X142, 1/2#5 | 1/2#23 |  | 9.5 |
| X143, 4/5#5 | 1/5#23 |  | 5.5 |
| X144, 3/5#5 | 2/5#23 |  | 8.0 |
| X145, 9/10#5 | 1/10#23 |  | ¹5 |
| X146, 4/5#6 | 1/5#23 |  | 8.5 |
| X147, 9/10#6 | 1/10#23 |  | 6.0 |
| X149, 1/2#9 | 1/2#19 |  | 6.0 |
| X151 | #7 |  | 8.1 |
| X152, 4/5#7 | 1/5#23 |  | 5.5 |
| X153, 3/5#7 | 2/5#23 |  | 7.8 |
| X154, 1/2#7 | 1/2#23 |  | 5.8 |
| X222 | #24 |  | 9 |
| X223 | #25 |  | 8 |
| X224 | #26 |  | 8 |
| X244 | #31 | TPP 1 gm | 11 |
| X245 | #32 | TPP 1 gm | 5.5 |
| X246 | #33 | TPP 1 gm | 9.5 |
| X289 | #38 | TPP 1 gm | 14 |
| X292 | #46 | TPP 1 gm | 15 |

TABLE II (Part 2)

| Run | Pore size+ Uniformity | Foam Strength | Remarks |
|---|---|---|---|
| X118 | Very poor | Poor | Very friable, weak. |
| X119 | Poor | do | Friable, weak. |
| X120 | Good | do | Friable, fairly weak. |
| X274 | do | Good | Excellent foam. |
| X121 | Fine, even | Very poor | Friable, weak. |
| X122 | do | do | Weak, friable. |
| X252 | Good | Good |  |
| X123 | Fair | do | Tough. |
| X124 |  |  |  |
| X125 | Good | Poor | Very friable and weak. |
| X126 |  |  |  |
| X127 | Fair | Fair | Fairly strong. |
| X276 | Good | Very good | Slightly flexible, tough, contains 0.3 gm sodium tetraborate. |
| X128 | Fair | Very strong | Dense, hard. |
| X130 | Poor | Good | Fairly strong. |
| X131 | Good | do | Slightly flexible, tough. |
| X132 | Poor | Fair | Fairly strong, slightly friable. |
| X133 | Good | Good | Strong, dense, hard, flexible. |
| X134 | do | do | Strong, not friable. |
| X135 | Fairly good | do | Not friable, slightly flexible. |
| X136 | Good | do | Do. |
| X137 | Fair | do | Not friable, strong, slightly flexible. |
| X138 | Fairly good | do | Do. |
| X139 | Good | do | Very dense, strong. |
| X140 | do | do | Dense, strong, slightly flexible. |
| X141 | Poor | do | Strong, slightly flexible. |
| X142 | Good | do | Do. |
| X143 | Poor | Poor | Slightly flexible. |
| X144 | Good | Good | Non-friable, slightly flexible. |
| X145 | do | do | Strong, non-friable, slightly flexible. |
| X146 | Fairly poor | do | Non-friable. |
| X147 | do | do | Do. |
| X149 | Poor | do | Uneven blowing, non-friable. |
| X151 | Very poor | Very poor | Large voids, non-friable. |
| X152 | Poor | Good | Do. |
| X153 | Fairly good | do | Large end void, otherwise. |
| X154 | do | Very food |  |
| X222 | Fair | Good |  |
| X223 | Good | do |  |
| X224 | Fair | do |  |
| X244 | Poor | Fair |  |
| X245 | do | do |  |
| X246 | do | Good | Slightly flexible. |
| X289 | Good | Very good | Very dense foam used 0.3 gm. tetraborate and 0.15 gm. dibutyl tin and L520. |
| X290 | do | Very strong | Do. |

¹ About.
² Dense, porous mass.
³ New batch.

While the specific examples all show the use of toluene diisocyanate (a 80-20 mixture of the 2, 4- and the 2,6-isomers), other organic diisocyanates may be used equally as well in the reaction. These include the aromatic, the aliphatic and the cycloaliphatic diisocyanates and combinations of these types. Arylene diisocyanates, that is those in which both isocyanate groups are attached directly to the aromatic ring, are preferred since these, in general, react more rapidly under the operating conditions than do the alkalene diisocyantes.

Representative compounds include toluene-2,4-diisocyanate; toluene-2,-diisocyanate; mixtures of toluene-2,4-diisocyanate and toluene-2,6-diisocyanate; m-phenylene diisocyanate; p-phenylene diisocyanate; 4-chloro-1,3-phenylene diisocyanate; 4,4'-biphenylene diisocyanate; methylene bis (4-phenlisocyanate); 1,5-naphthylene diisocyanate; 1,4-tetramethylene diisocyanate; 4,4'-methylene-bis(cyclohexyl isocyanate); 4,4'-methylene di-o-tolylisocyanate; 1,5-tetrahydronaphthylene diisocyanate; hexamethylene diisocyanate; dianisidine diisocyanate and the like.

The other component of the isocyanate terminated urethane resin is a polyol, usually a diol selected from the glycols, the polyglycols, the polyalkylene ether glycols and the polyhydric alcohols. Typical compounds include ethylene glycol; diethylene glycol; triethylene glycol; tetraethylene glycol; the various polyethylene and polypropylene glycols; 1,2-propanediol; 1,4-butanediol; 1,5-pentanediol and 1,10-decanediol. Useful polyols other than the diols include polyether tetrols having four secondary hydroxyl groups each joined to a central carbon atom by an oxyalkylene chain; polyoxypropylene derivatives of trimethylol propane; and polyoxypropylene derivatives of sorbitol.

The other principal component of the foaming system is a solid that provides free water when heated to a temperature less than the foaming temperature but in excess of the melting point of the urethane resin. These include the solid hydrates of inorganic or organic compounds that liberate all or part of the water of hydration at temperatures between about 50 and 120° and which have a low water vapor pressure at room temperature and boric acid.

Suitable solid substances capable of releasing water at the desired temperature level include: boric acid; hydrates such as: sodium tetraborate decahydrate (borax), potassium ferrocyanide trihydrate, manganese chloride tetrahydrate, disodium hydrogen phosphate heptahydrate, chloral hydrate $—CCl_3CH(OH)_2—$, ammonium chromium sulfate dodecahydrate, sodium acetate trihydrate, piperazine hexahydrate, potassium ferrocyanide trihydrate, manganese dichloride tetrahydrate, calcium sulfate dihydrate, barium chloride dihydrate, citric acid, monohydrate, oxalic acid dihydrate, sodium oxalate.

A catalyst may be used both in connection with the urethane forming reaction (note Example V, VI, and VII) and in connection with the foaming reaction to accelerate and to regulate the rate of reaction once it is initiated. The preferred catalyst for the urethane forming reaction is N-methylmorpholine and for the foaming reaction is dibutyl tin di-2-ethyl hexoate. Other suitable catalysts include other organo tin compounds and the Lewis acids in general, triethylene diamine, more properly identified as diaza bicyclo-(2,2,2)-octane, and the other tertiary amines and mixtures of tertiary amines and organo tin compounds.

In some instances it is desirable to incorporate in the mixture a solvent for the urethane resin. Suitable solvents are those organic compounds which are solid at room temperature but which melt at a temperature at or below the melting temperature of the resin. Typical solvents include triphenyl phosphate (M.P. 50° C.) p-nitro anisole (M.P. 54° C.) and benzohydrol (M.P. 69° C.). Not only do these materials act as solvents for the urethane resin, but also as plasticizers for the finished foam. Triphenyl phosphate is of particular interest since it not only acts as a solvent for the reaction mass and a plasticizer for the foam but it also strengthens and reinforces the finished foam.

In order to achieve a more uniform pore size, a desirable ingredient of the foaming mixtur eis a surface active agent. A particularly desirable class of such agents are the water soluble silicone resins such as Silicone L–520 identified above. Other suitable silicone resins include Silicone L–521 supplied by Union Carbide Company and "DC–199" and DC–113 supplied by Dow-Corning. L–521 is a siloxane-polyoxyalkylene block copolymer wherein the siloxane portion consists essentially of siloxane units having silicon-bonded methyl groups and the oxyalkylene portion consists essentially of oxyethylene units. DC–113 and DC–199 is a silicone-glycol copolymer. Certain poly dimethylsiloxanes such as "DC–200–3," "DC–200–5," "DC–200–100" DC–200–50" and DC–200–500" all supplied by Dow-Corning may be used. Other suitable surface active agents include "Tween 40" which is described as polyoxyethylene sorbitan monopalmitate and is supplied by the Atlas Powder Company; "Span 80" which is described as sorbitan monooleate and is supplied by the Atlas Powder Company and "Emulphor EL–719" which is described as a polyoxyethylated vegetable oil and is supplied by Antara Chemical Division of General Aniline and Film Company.

What is claimed is:

1. A free-flowing composition that is stable and non-reactive at room temperature and is capable upon being heated to an elevated temperature substantially in excess of room temperature of melting, fusing, and reacting to form a plastic foam composition which comprises a mixture of finely divided particles of a comminuted solid thermoplastic resinous material containing a plurality of unreacted isocyanate groups, which is the reaction product of an organic diisocyanate and a polyol selected from the group consisting of a diol, a polyoxypropylene derivative of trimethylol propane, a polyoxypropylene derivative of pentaerythritol and a polyoxypropylene derivative of sorbitol, characterized by a melting point of between 30° and 70° C., and of finely divided particles of a material which releases water at a temperature in excess of the melting point of said thermoplastic resinous material and below the foam-forming reaction temperature.

2. The composition of claim 1, wherein the resinous material has an unreacted isocyanate content between 5 and 21 weight percent based on the total weight of the resinous material.

3. The composition of claim 1, wherein the resinous material is the reaction product of an organic diisocyanate and a polyol selected from the group consisting of a diol, a polyoxypropylene derivative of trimethylol propane, a polyoxypropylene derivative of pentaerythritol and a polyoxypropylene derivative of sorbitol and stoichiometric excess of an organic diisocyanate.

4. The composition of claim 3, wherein the polyol is the diol ethylene glycol, the diioscyanate is toluene diisocyanate, and the stoichiometric excess of isocyanate is such that there is 16–21 percent free isocyanate by weight based on the total weight of the reaction product.

5. The composition of claim 3, wherein the diol is 1, 4-butanediol, the diisocyanate is toluene diisocyanate, and the stoichiometric excess of isocyanate is such that there is 13–18 percent free isocyanate by weight based on the total weight of the reaction product.

6. The composition of claim 3, wherein the diol is 1,5-pentanediol, the diisocyanate is toluene diisocyanate, and the stoichiometric excess of isocyanate is such that there is about 12½ to 17½ percent free isocyanate by weight based on the total weight of the reaction product.

7. The composition of claim 3, wherein the diol is diethylene glycol, the diisocyanate is toluene diisocyanate, and the stoichiometric excess of isocyanate is such that there is 10–16 percent free isocyanate by weight based on the total weight of the reaction product.

8. The composition of claim 3, wherein the diol is trimethylene glycol, the diisocyanate is toluene diisocyanate, and the stoichiometric excess of isocyanate is such that there is 6 to 12½ percent free isocyanate by weight based on the total weight of the reaction product.

9. The composition of claim 3, wherein the diol is polyethylene glycol 200, the diisocyanate is toluene diisocyanate, and the stoichiometric excess of isocyanate is such that there is 5–10 percent free isocyanate by weight based on the total weight of the reaction product.

10. The composition of claim 3, wherein the polyol is selected from the group consisting of polyoxypropylene derivatives of pentaerythritol.

11. The composition of claim 3, wherein the polyol is selected from the group consisting of polyoxypropylene derivatives of trimethylol propane.

12 The composition of claim 3, wherein the polyol is selected from the group consisting of polyoxypropylene derivatives of sorbitol.

13. The composition of claim 1, wherein the material capable of releasing water at an elevated temperature is a solid material capable of releasing water at a temperature in the range 50° to 120° C. and is selected from the group consisting of boric acid, the hydrates of inorganic compounds, and the hydrates of organic compounds.

14. The composition of claim 13, wherein the solid material is boric acid.

15. The composition of claim 13, wherein the solid material is sodium tetraborate decahydrate.

16. The process of producing plastic foam compositions which comprises mixing and blending a solid thermoplastic resinous material containing a plurality of unreacted isocyanate groups which is the reaction product of an organic diisocyanate and a polyol selected from the group consisting of a diol, a polyoxypropylene derivative of trimethylol propane, a polyoxypropylene derivative of pentaerythritol and a polyoxypropylene derivative of sorbitol characterized by a melting point between 30–70° C. with a solid material which releases water at a temperature above the melting point of said thermoplastic resinous material and below the foam-forming reaction temperature, and thereafter heating the mixture to a reaction temperature resulting in foam formation.

17. A process as described in claim 16, wherein said reaction temperature is in the range of 70–130° C. and said second material will release water at a temperature in the range of 50–120° C.

18. A solid composition that is stable and nonreactive at room temperature and is capable upon being heated to an elevated temperature of melting, fusing and reacting to form a plastic foam composition which comprises a mixture of a solid thermoplastic resinous material containing a plurality of unreacted isocyanate groups, which is the reaction product of an organic diisocyanate and a polyol selected from the group consisting of a diol, a polyoxypropylene derivative of trimethylol propane, a polyoxypropylene derivative of pentaerythritol and a polyoxypropylene derivative of sorbitol characterized by a melting point between 30–70° C. and a solid material which releases water at a temperature in excess of the melting point of said thermoplastic resinous material and at a temperature below the foam-forming reaction temperature.

19. The composition of claim 1, wherein said material which releases water does so in the temperature range of 50–120° C.

(References on following page)

References Cited by the Examiner

UNITED STATES PATENTS

| | | | |
|---|---|---|---|
| 2,706,311 | 4/1955 | Durst et al. | 260—2.5 |
| 2,889,291 | 6/1959 | Moore | 260—2.5 |
| 2,911,379 | 11/1959 | Parker et al. | 260—2.5 |
| 2,921,915 | 1/1960 | Brochhagen et al. | 260—2.5 |
| 2,296,147 | 2/1960 | Rappaport et al. | 260—2.5 |

FOREIGN PATENTS

| | | |
|---|---|---|
| 167,675 | 5/1956 | Australia. |
| 537,295 | 2/1957 | Canada. |

LEON J. BERCOVITZ, *Primary Examiner.*

DONALD E. CZAJA, *Examiner.*